United States Patent [19]

Morioka

[11] Patent Number: 5,286,813
[45] Date of Patent: Feb. 15, 1994

[54] MELT KNEADING POLYCARBONATE WITH COMPOUND CONTAINING CARBON TO CARBON DOUBLE BOND

[75] Inventor: Masataka Morioka, Moka, Japan

[73] Assignee: GE Plastics Japan, Ltd., Tokyo, Japan

[21] Appl. No.: 947,369

[22] Filed: Sep. 18, 1992

[30] Foreign Application Priority Data

Nov. 25, 1991 [JP] Japan .................. 3-334590

[51] Int. Cl.$^5$ .............................................. C08G 64/42
[52] U.S. Cl. ........................................ 525/468; 525/439; 525/442; 525/445; 525/462; 525/467
[58] Field of Search ............... 525/468, 467, 462, 439, 525/442, 445

[56] References Cited

U.S. PATENT DOCUMENTS

3,622,331 11/1971 Thomas ................................ 525/468
4,933,425 6/1990 Galluci ................................ 525/468

FOREIGN PATENT DOCUMENTS

0001579 5/1979 European Pat. Off. .
0072065 2/1983 European Pat. Off. .
0346996 12/1989 European Pat. Off. .
3513715 10/1986 Fed. Rep. of Germany .
2121202 8/1972 France .

*Primary Examiner*—Harold D. Anderson

[57] ABSTRACT

The present invention discloses a polycarbonate modification method wherein a polycarbonate resin having (a) a carbon-carbon double bond, and (b) at least one group selected from the group consisting of —C(=O)—Cl, —C(=O)—Br, —C(=O)—OH, —OH, —O—C(=O)—Cl and —O—C(=O)—Br, is melt-kneaded in the presence of a radical initiator. Polycarbonate resins prepared according to the present method retain the desirable properties associated with polycarbonates while exhibiting decreased surface gloss.

1 Claim, No Drawings

MELT KNEADING POLYCARBONATE WITH COMPOUND CONTAINING CARBON TO CARBON DOUBLE BOND

DETAILED DESCRIPTION OF THE INVENTION

1. Industrial Field of Use

The present invention relates to a polycarbonate (PC) resin composition; more specifically, it relates to a delustered PC resin composition. This invention relates also to a modification process for delustering polycarbonate resins.

2. Description of the Prior Art, and Problems Therewith

Polycarbonate resins have a high impact resistance and are self-extinguishing, their heat resistance is higher than that of other resins, and they have excellent electrical properties and dimensional stability; for these reasons, they are widely used as engineering plastics. Although the high gloss of PC resins is desirable in some applications, in applications where glare is unwanted, such as the interior trim in automobiles and "office automation" equipment housings, a delustered surface is required. Such a delustered surface can be formed by coating the molded piece with a delustering paint or by using a patterned mold in the molding process, but because either of these increases costs, PC resin compositions that form a delustered surface during molding have been awaited.

Hence, the object of the present invention is to lower the surface gloss while retaining the properties intrinsic to polycarbonate resins.

MEANS FOR RESOLVING THE PROBLEMS

The resin composition of the present invention includes: (A) a polycarbonate resin containing, as a copolymeric constituent or an end-group sealer, a compound having:

(a) a carbon-carbon double bond, and
(b) at least one group selected from among —C(=O)—Cl, —C(=O)—Br, —C(=O)—OH, —OH, —O—C(=O)—Cl and —O—C(=O)—Br;

or this and (B) 0.005–1.0 part by weight of a radical initiator per 100 parts by weight of the polycarbonate resin.

The second invention disclosed here provides a polycarbonate modification method characterized by melt-kneading a polycarbonate resin containing, as a copolymeric constituent or an end-group sealer, a compound having:

(a) a carbon-carbon double bond, and
(b) at least one group selected from the following: —C(=O)—Cl, —C(=O)—Br, —C(=O)—OH, —OH, —O—C(=O)—Cl and —O—C(=O)—Br in the presence of a radical initiator.

The polycarbonate resins used in this invention include not only aromatic polycarbonates known to the prior art, but also copolyester carbonates.

Polycarbonates include a carbonate component and a biphenol component. Examples that may be cited of precursors for introducing the carbonate component include phosgene and diphenyl carbonate. Suitable diphenols include monocyclic and polycyclic diphenols which may have a heteroatom, are inert under polycarbonate production conditions, and have substituents which are inert to the influence of electromagnetic waves. Examples that may be cited include hydroquinone, resorcinol, dihydroxydiphenol, bis(hydroxyphenyl)alkanes, bis(hydroxyphenyl)cycloalkanes, bis(hydroxyphenyl)sulfides, bis(hydroxyphenyl)ethers, bis(hydroxyphenyl)ketones, bis(hydroxyphenyl)sulfoxides, bis(hydroxyphenyl)sulfones, and $\alpha,\alpha'$-bis(hydroxyphenyl)diisopropylbenzene, as well as ring-alkylated and ring-halogenated compounds thereof.

Suitable diphenols include the following: 4,4'-dihydroxydiphenol, 2,2-bis(4-hydroxyphenyl)propane (known as bisphenol A), 2,4'-bis(4-hydroxyphenyl)-2-methylbutane, 1,1-bis(4-hydroxyphenyl)cyclohexane, $\alpha,\alpha'$-bis(4-hydroxyphenyl)-p-diisopropylbenzene, 2,2-bis(3-methyl-4-hydroxyphenyl)propane, 2,2-bis(3-chloro-4-hydroxyphenyl)propane, bis(3,5-dimethyl-4-hydroxyphenyl)methane, 2,2-bis-(3,5-dimethyl-4-hydroxyphenyl)propane, bis(3,5-dimethyl-4-hydroxyphenyl)sulfone, 2,4-bis(3,5-dimethyl-4-hydroxyphenyl)-2-methylbutane, 1,1-bis(3,5-dimethyl-4-hydroxyphenyl)cyclohexane, $\alpha,\alpha'$-bis(3,5-dimethyl-4-hydroxyphenyl)-p-diisopropylbenzene, 2,2-bis(3,5-dichloro-4-hydroxyphenyl)propane, 2,2-bis(3.5-dibromo-4-hydroxyphenyl)propane.

Examples of diphenols that are especially desirable are 2,2-bis(4-hydroxyphenyl)propane, 2,2-bis(3,5-dimethyl-4-hydroxyphenyl)propane, 2,2-bis(3.5-dichloro-4-hydroxyphenyl)propane, 2,2-bis(3,5-dibromo-4-hydroxyphenyl)propane, and 1,1-bis(4-hydroxyphenyl)cyclohexane. Any desirable combination of the above diphenols can also be used.

In addition to the above-mentioned monomer diphenol, it is also possible to additionally use oligomers or polymers having two end groups capable of undergoing polymerization reactions under the polycarbonate synthesis conditions. Examples of such end groups include phenolic OH groups, chlorocarbonate groups and carboxylic acid chloride groups. Examples of oligomer- or polymer-type blocks prepared beforehand that either already have such reactive groups or are capable of forming such groups by means of suitable post-treatment include polysiloxanes; polycondensates composed of aliphatic diols and saturated aliphatic or aromatic dicarboxylic acids, such as saturated aliphatic polyesters composed of hydrogenated dimeric fatty acids; aromatic polyether sulfones, and aliphatic polyethers.

To improve the flowability, additional use by a known means can also be made of a small amount, preferably 0.05–2.0 mol % (with respect to the number of moles of biphenol used), of a compound having a functionality of 3 or more [functional groups], and in particular a compound having three or more phenolic hydroxy groups.

Compounds having three or more phenolic hydroxyls that can be used include the following: 1,3,5-tri(4-hydroxyphenyl)benzene, 1,1,1-tri(4-hydroxyphenyl)ethane, 2,6-bis(2-hydroxy-5-methylbenzyl)-4-methylphenol, 2-(4-hydroxyphenyl)-2-(2,4-dihydroxyphenyl)-o-terephthalate, tetra(4-hydroxyphenyl)propane, hexa(4-(2-(4-hydroxyphenyl)prop-2-yl)phenyl)-o-terephthalate, tetra(4-hydroxyphenyl)methane and 1,4-bis(4',4'-dihydroxytriphenyl)methyl)benzene. Several other trifunctional compounds that may be cited are 2,4-dihydroxybenzoic acid, trimesic acid, cyanuric acid chloride and 3,3-bis(4-hydroxy-3-methylphenyl)-2-oxo-2,3-dihydro-indole.

The copolyester carbonate should preferably be one containing constituent units having formulas 1 and 2 below:

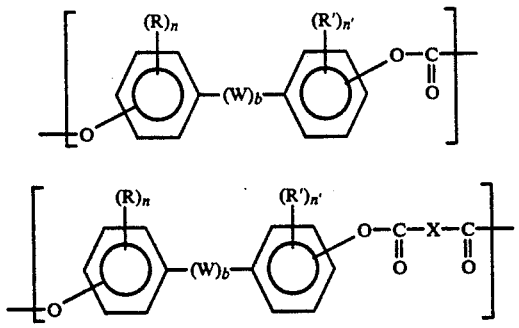

$$\left[ \begin{array}{c} \phantom{x} \end{array} \right] \quad [1]$$

$$\left[ \begin{array}{c} \phantom{x} \end{array} \right] \quad [2]$$

where R and R' are each independently halogen atoms. monovalent hydrocarbon groups or hydrocarbonoxy groups; W is a divalent hydrocarbon group, —S—, —S—S—, —O—, —S(=O)—, —(O=)S(=O)— or —C(=O)—; n and n' are each independently integers from 0 to 4; X is a divalent aliphatic group having 6-18 carbons; and b is 0 or 1; and where the amount of constituent units having formula 2 accounts for 2-30 mol % of the total amount of the constituent units having formulas 1 and 2. Examples of monovalent hydrocarbon groups that may be cited include alkyl groups having 1-12 carbons such as methyl, ethyl, propyl and decyl groups; cycloalkyl groups having 4-8 carbons such as cyclopentyl and cyclohexyl groups; aryl groups having 6-12 carbons such as phenyl, naphthyl and biphenyl groups; aralkyl groups having 7-14 carbons such as benzyl and cinnamyl groups; and alkalyl groups having 7-14 carbons such as tolyl and cumenyl groups. Of these, the use of alkyl groups is preferable. Examples that may cited of the hydrocarbon group in the hydrocarbonoxy groups include the above-cited hydrocarbon groups. Preferable examples of hydrocarbonoxy groups such as this include alkoxy groups, cycloalkyloxy groups, aryloxy groups, aralkyloxy groups and alkalyloxy groups, with the use of alkoxy groups and aryloxy groups being preferable. In cases where X is a divalent hydrocarbon group, this may be an alkylene group having 1-30 carbons such as methylene, ethylene, trimethylene and octamethylene groups; alkylidene groups having 2-30 carbons such as ethylidene and propylidene groups; cycloalkylene groups having 6-16 carbons, such as cyclohexylene and cyclododecylene groups; or cycloalkylidene groups such as a cyclohexylidene group.

The constituent units represented by above formula 2 consist of a diphenol component and a divalent acid component. A diphenol like those cited above can be used to introduce the diphenol component. The monomer used to introduce the divalent acid component is a divalent acid or an equivalent substance. Examples of divalent acids include aliphatic diacids having 8-20 carbons, and preferably 10-12 carbons. These divalent acids or their equivalent substances may be straight-chain, branched or cyclic. The aliphatic diacids should preferably be α,α-dicarboxylic acids. Preferable examples of divalent acids such as these include straight-chain saturated aliphatic dicarboxylic acids such as sebacic acid (decanedioic acid), dodecanedioic acid, tetradecanedioic acid, octadecanedioic acid and eicosanedioic acid; the use of sebacic acid and dodecanedioic acid is especially desirable. Examples of equivalent substances that may be cited include the acid chlorides and other acid halides of the above divalent acids, including aromatic esters such as diphenyl esters.

Here, the number of carbons in the ester portion of the ester is not included in the number of carbons in the acid. The above-cited divalent acid or its equivalent substance may be used alone or as a combination of two or more thereof.

The above copolyester polycarbonate has the two above constituent units indicated by formulas 1 and 2 in the following proportions. That is, the amount of the constituent unit represented by formula 2 is 2-30 mol %, preferably 5-25 mol %, and most preferably 7-20 mol %, based on the total amount of the units represented by formulas 1 and 2.

The weight-average molecular weight of polyester carbonate is generally 10,000-100,000. and preferably 18,000-40,000. The weight-average molecular weight referred to here is measured by gel permeation chromatography using polystyrene corrected for polycarbonate use. The intrinsic viscosity measured at 25° C. in methylene chloride should be 0.35-0.65 dL/g.

The above-described copolyester carbonate can be prepared by a known polycarbonate production method, such as an interfacial polymerization process using phosgene or a melt polymerization process. For example, preparation can be carried out by the methods cited in U.S. Pat. No. 4,238,596 (granted to Quinn), and U.S. Pat. No. 4,238,597 (Quinn and Markezich). More specifically, prior to the reaction of the esterforming group and diphenol, an acid halide is formed, following which this is reacted with phosgene. In Goldberg's basic solution process (U.S. Pat. No. 3,161,121), a pyridine solvent can be used or a dicarboxylic acid can be employed. It is also possible to make use of a melt polymerization process that employs an α,ω-dicarboxylic acid (e.g., sebacic acid) diester (e.g.. the diphenyl ester). A preferable production method is the Kochanowski improved process described in U.S. Pat. No.4,286,083. In this method, a lower diacid such as adipic acid is first rendered into the form of a salt (preferably an alkali metal salt such as the sodium salt). then is added to a reaction vessel containing the diphenol. In the reaction with phosgene, the aqueous phase is held at an alkaline pH, and preferably a pH of approximately 8-9, following which it is raised to a pH of 10-11 when a minimum of about 5% of the reaction with phosgene remains.

In cases where the interfacial polymerization method is based on a bischloroformate method, for example, it is preferable to make use of a catalyst system commonly used in the synthesis of polycarbonate or copolyester carbonate. Examples that may be cited of the main catalyst system include amines such as tertiary amines, amidine and guanidine. Tertiary amines are generally used; of these, a trialkylamine such as triethylamine is especially desirable.

In the above-mentioned polycarbonate resins, examples of end-group sealers for modifying molecular weight that can be used include phenol, p-t-butylphenol, isononylphenol, isooctylphenol, m- or p-cumylphenol (preferably p-cumylphenol) and chromanyl compounds.

A polycarbonate containing, either as a copolymeric constituent or an end-group sealer, a compound having:
(a) a carbon-carbon double bond, and
(b) at least one group selected from among —C(=O)—Cl, —C(=O)—Br, —C(=O)—OH, —OH, —O—C(=O)—Cl and —O—C(=O)—Br (that is, a polycarbonate resin containing carboncarbon double bonds within the structure)

is used in the above-described polycarbonate resin according to the present invention. A polycarbonate having double bonds at the ends of the molecule and in which the ends have been sealed by this type of compound is especially preferable. Polycarbonate resins with double bonds such as this can be obtained by having the above-described compound present when the carbonate component precursor and diphenol are polymerized. Examples that may be cited of these compounds include unsaturated aliphatic monocarboxylic acids such as acrylic acid, methacrylic acid, crotonic acid, oleic acid and linoleic acid, as well as maleimide benzoic acid, and their acid halides; unsaturated dicarboxylic acids such as maleic acid, fumaric acid and itaconic acid, as well as their acid halides; and isopropenyl phenol, allyl phenol, maleimide phenol, and their halogenocarbonates. These may be used alone or as mixtures thereof. In order to produce a polycarbonate in which the above-described compound has been copolymerized on the ends of the molecule, of the above-mentioned compounds, it is preferable to use an unsaturated aliphatic monocarboxylic acid, maleimide benzoic acid, or their acid halides; or isopropenyl phenol, allyl phenol, maleimide phenol, or their halogenocarbonates.

The compound serving as the copolymerization ingredient or the end-group sealer is normally added in an amount of 0.001–0.2 mole, and preferably 0.002–0.1 mole, per mole of the diphenol starting material.

Component (A) in the present invention may consist of just the above-described polycarbonate resin having double bonds, or it may consist of both this and the (unmodified) polycarbonate resin of the prior art. The range in the compounding ratio of these two ingredients is 0–99.5 parts by weight of the prior-art polycarbonate resin to 0.5–100 parts by weight of the polycarbonate resin having double bonds at the end. Preferably, this range is 80–90 parts by weight of the prior-art polycarbonate resin to 1–20 parts by weight of the polycarbonate resin having double bonds at the end.

Examples that may be cited of the radical initiator (B) used in the present invention include organic peroxides such as cumene hydroperoxide, diisopropylbenzene hydroperoxide, t-butylhydroperoxide, p-menthane hydroperoxide and di-t-butylhydroperoxide, and azobisisobutyronitrile. These may be used singly or as a mixture of two or more thereof.

Component (B) is mixed in an amount of 0.005–1.0 part by weight, and preferably 0.01–0.3 part by weight, per 100 parts by weight of component (A). When the amount of (B) is less than 0.005 part by weight, this is insufficient to obtain a low-gloss resin composition; when this is more than 1.0 part by weight, it invites deterioration of the resin.

The resin compositions according to the present invention are also able to elicit the same effects in blends between the polycarbonate and other resins. That is, in addition to the polycarbonate resin, other resins can be included as well. Examples that may be cited of these other resins include polyesters such as PBT, ABS resin, AES resin, SAN resin and polystyrene.

Also, depending on the desired aim, conventional additives may be added to the resin compositions of the present invention during mixing or molding of the resin, provided these do not compromise the properties of the composition. Examples of such additives include pigments, dyes, impact-resistant modifiers, reinforcing agents (e.g., glass fibers, carbon fibers, potassium titanate fibers), fillers (e.g., carbon black, silica, titanium oxide), heat-resisting agents, antioxidants, anti-weathering agents, lubricants, parting agents, crystal nucleating agents, plasticizers, flame retardants, flow enhancers and antistatic agents.

There is no particular restriction on the method employed for preparing the resin compositions of the present invention, it being possible to use a conventional method with satisfactory effects. It is desirable, however, to make use of a conventional melt mixing method. The use of a small amount of solvent is also possible, but is generally not necessary. As for the apparatus, particular mention can be made of extruders, Banbury-type mixers, rollers and kneaders; these may be operated in a batch-wise or continuous manner. There is no particular restriction on the order in which the ingredients are mixed.

EXAMPLE

The present invention shall now be illustrated more concretely through the examples given below. It should be understood, however, that these examples in no way limit the scope of the invention.

The following compounds were used in the examples.

COMPONENT (A)

PC-1: A polycarbonate having an intrinsic viscosity (as measured at 250° C. in methylene chloride) of 0.50 dL/g (General Electric Co.).

PC-2: A polycarbonate having double bonds at the ends of the molecules, and produced in the following manner. First, 2.28 kg (10 moles) of 2,2-bis-(4-hydroxyphenyl)propane (i.e., bisphenol A), 75.6 kg (0.4 mole) of N-(p-hydroxyphenyl)maleimide, and 14 mL of triethylamine were added to a mixture of 6 liters of ion-exchanged water and 7 liters of methylene chloride, then [the entire mixture] was mixed vigorously at room temperature. Next, a 50% aqueous solution of sodium hydroxide was added and, while holding the solution pH at 10, phosgene was blown into this solution mixture at a rate of 60 g/min for 20 minutes. After the completion of phosgene addition, stirring was carried out for 5 days, following which the methylene chloride solution and the aqueous water were separated. This methylene chloride solution was washed first with water, then 2% hydrochloric acid, then water once again, after which the solvent was removed and the remaining product was dried overnight at 100° C.

The resulting product was submitted to IR analysis, and $v_{C=O}$ absorption was observed at 1704 cm$^{-1}$. From H$^1$NMR measurements, a peak corresponding to a hydrogen atom linked to the double-bond carbon in maleimide was noted at $\delta$66.85. From molecular-weight measurements by GPC, the number-average molecular weight of this product was found to be 11,300, and the weight-average molecular weight was 28,100.

COMPONENT (B)

Radical Initiator: Cumene hydroperoxide

EXAMPLES 1-3, AND COMPARATIVE EXAMPLES 1-3

The various ingredients were mixed in the ratio (weight ratio) indicated in Table 1, extruded in a twin-screw extruder (30 mm) set at 2900° C. and 450 rpm. and pellets produced. These pellets were dried at 120° for 4 hours, then injection molded at a temperature setting of 300° C. and a mold temperature of 80° C. thereby fabricating test pieces. The Izod impact strength, gloss, and total light transmittance of the test pieces were measured. The results are given in Table 1.

The Izod impact strength was determined by measuring the ⅛-inch bar notched Izod impact strength according to ASTM D256. The gloss was measured at an incident angle of 60° and at an angle of reflection of 60° using a glossmeter (model GM-261, made by Murakami Shikisai Gijutsu Kenkyujo). The numbers indicated are the relative values based on a value of 100 measured for the resin composition in Comparative Example 1. The total light transmittance was measured using a Model 1001 DP Color and Color Difference Meter (Nihon Denshoku Kogyo KK).

TABLE 1

|  | Examples | | | Comparative Examples | | |
| --- | --- | --- | --- | --- | --- | --- |
|  | 1 | 2 | 3 | 1 | 2 | 3 |
| Ingredients (parts by weight): | | | | | | |
| PC-1 | 98 | 95 | 90 | 95 | 100 | 100 |
| PC-2 | 2 | 5 | 10 | 5 | — | — |
| Radical initiators | 0.1 | 0.1 | 0.1 | — | — | 0.1 |
| Evaluation tests | | | | | | |

TABLE 1-continued

|  | Examples | | | Comparative Examples | | |
| --- | --- | --- | --- | --- | --- | --- |
|  | 1 | 2 | 3 | 1 | 2 | 3 |
| Izod impact strength (kg-cm/cm) | 77 | 78 | 77 | 77 | 78 | 75 |
| Gloss (relative value) | 63.8 | 31.5 | 17.9 | 99.4 | 100 | 96.3 |
| Total light transmittance (%) | 85.2 | 83.5 | 84.2 | 87.8 | 88.0 | 86.0 |

ADVANTAGES OF THE INVENTION

Because the resin compositions according to the present invention have a low surface gloss and also retain the clarity and the physical properties intrinsic to polycarbonate resins, they have broad applications as materials for delustered molded pieces, and are thus industrially useful.

I claim:

1. A polycarbonate modification method comprising melt-kneading a polycarbonate resin containing a compound having:
   (a) a carbon-carbon double bond, and
   (b) at least one group selected from the group consisting of —C(=O)—Cl, —C(=O)—Br, —C(=O)—OH, —OH, —O—C(=O)—Cl and —O—C(=O)—Br
in the presence of a radical initiator.

* * * * *